2,888,377
Patented May 26, 1959

2,888,377

CALCIUM SILICATE AND METHOD OF PRODUCING SAME

Edward M. Allen, Wadsworth, Ohio, assignor to Columbia-Southern Chemical Corporation, Allegheny County, Pa., a corporation of Delaware No Drawing. Application March 25, 1954
Serial No. 418,753

4 Claims. (Cl. 162—181)

This invention relates to a novel form of an alkaline earth metal silicate and also to the use of such alkaline earth metal silicate for various purposes.

According to the present invention, acicular calcium silicate which consists of a large number of extreme finely divided, three-dimensional crystals of calcium silicate has been prepared. These crystals are extremely small, usually ranging from about 50 to 200 millimicrons in width and having a length 20 to 30 times their width. Their thickness is about ⅓ their width. To the naked eye, the calcium silicate herein contemplated has a close resemblance to cellulose floc and even appears to be fibrous in character.

According to a further embodiment of the invention, the acicular calcium silicate herein contemplated may be prepared by reacting together calcium hydroxide and silica in substantially equimolecular proportions in aqueous medium and at a superatmospheric pressure and a temperature substantially in the range of 450 to 650° F. while agitating the mixture in order to prevent the reaction mixture from setting up to a solid, interlocked mass. In this case, sufficient water is used to disperse the reactants and minimize any tendency of the reactants to set up.

Following the reaction of the calcium hydroxide and sand to form the calcium silicate desired, the product is recovered by filtration and/or settling and is dried under conditions which prevent or minimize disruption of the calcium silicate crystal structure which has been obtained. Thus, drying temperatures below about 300° C. are found to be preferable. However, if a product containing no water of crystallization is desired, drying at higher temperatures may be resorted to. The resulting dry product appears to the naked eye to be in the form of a relatively fine powder. According to this invention, the needle-like crystals of calcium silicate are then liberated by subjecting the product to a grinding operation to break the particles to their individual needle-like units without disruption of the crystal formation. The product thus obtained appears to the naked eye to resemble in properties a cellulose or like fibrous floc.

In the reaction of the calcium hydroxide with the sand, it is desired that the sand be quite finely divided and be relatively pure. For best results, it is preferred that the sand be 95 percent $SiO_2$ or better on the anhydrous basis. On the other hand, the presence of impurities such as calcium oxide or the like are not particularly objectionable so long as the amount of CaO in the ultimate mixture is adjusted by adjusting the amount of calcium hydroxide in the reaction mixture. The sand used should be relatively in a fine state of division. Sand which has been ground to a point where 95 percent thereof will pass a 325-mesh screen and 99 percent a 200-mesh screen normally is suitable. Any slaked lime may be used as a source of calcium hydroxide. This lime may contain other materials. For example, dolomitic lime which contains a substantial amount of magnesium oxide may be used for this purpose. Also, the lime may contain minor quantities, rarely in excess of 5 percent by weight, of other metal oxides such as aluminum oxides, iron oxide, and the like.

The preparation of the calcium silicate is effected by mixing the calcium hydroxide and sand in an aqueous medium and heating the mixture in an autoclave at a temperature of 450 to 650° F. During the period of reaction, the mixture is agitated in order to prevent it from setting up to a solid state. In general, the amount of water present is in excess of 89 percent by weight, based upon the total reaction mixture, in order to inhibit any tendency of the mixture to set up. Inasmuch as the temperature is in excess of the boiling point of water, the autogenous pressure of the system is superatmospheric. Consequently, the reaction is conducted in an autoclave or other suitable pressure reactor.

The heating is continued for a time sufficient to permit completion of the reaction. This depends to a large degree upon the reactivity of the silica in the mixture. In general, the heating is continued for a period in excess of about one hour, usually in the range of 2 to 24 hours.

Following the reaction, the pressure is released and the reaction mixture is allowed to cool, and the resulting calcium silicate is recovered by filtration and/or settling. Thereafter, the product is dried.

Usually, a temperature of about 100 to 150° C. is adequate. Of course, the temperature which is referred to is the temperature of the calcium silicate undergoing drying. That is, it is readily possible that the temperature of the heat source used to effect the drying may be well above the maximum temperature at which drying should occur. On the other hand, because of vaporization of water, the temperature of the silicate may be well below this maximum temperature and, in such a case, a satisfactory product is obtained.

The resulting product is normally a relatively fine powder. This powder is then subjected to a treatment to liberate the needle-like crystals of calcium silicate. This may be effected by hammer milling the calcium silicate or by subjecting the calcium silicate to impact and attrition in an air suspension as, for example, by methods described in U.S. Patents Nos. 1,953,058, 1,948,609, 2,032,827, and the like.

As a consequence of the grinding of "crystal liberation," a product is obtained which is extremely fluffy in character and which resembles cellulose floc upon examination by the naked eye. That is, it appears fibrous. The apparent fibrous character of the product is not confirmed by examination under the electron microscope. On the contrary, the product, upon such examination, appears in the form of crystals about 50 to 200 millimicrons in width, having a length about 20 to 30 times their width, and a thickness about ⅓ their width. At all events, the product is substantially different from the pulverulent amorphous calcium silicate commonly available on the commercial market at the present time.

The following example is illustrative:

EXAMPLE I

Finely ground sand was washed and ground to pass through a 325-mesh screen. Thirty-eight pounds of this sand, 850 pounds of water, 48 pounds of finely divided hydrated lime which passes a 325-mesh screen and has a surface area of 16 square meters per gram, and 10 pounds of starch were placed in a 100-gallon autoclave and the autoclave was heated to a temperature of 475 to 480° F. over a period of 17 hours. The corn starch was used in order to reduce the tendency of the lime and sand to settle out during the reaction. During the heating, the mixture was continuously agitated and the pressure rose to about 510 pounds per square inch gauge. Heating was continued for a period of 22 hours. Thereafter, the pressure on the autoclave was reduced by cooling to 200° F. over a period of 5 hours and a finely divided slurry containing some small amount of grit, probably unreacted sand, was obtained. This product was dried at a temperature of 120° C. and subjected to a dry air classification which yielded 6.5 parts by weight of fine grit-free product to 1 part of a coarse product. The resulting product was hammer-milled and found to have a density of 5.6 pounds per cubic foot. When subjected to air attrition by a "micronizer," the product had a bulk density of 2.5 pounds per cubic foot. It had a composition of $5CaO \cdot 5SiO_2 \cdot H_2O$, and appeared to the naked eye to be very similar in character to a fibrous floc having a surface area of 54 square meters per gram.

The process described in the above example may be varied to a substantial degree. Best results are obtained when one mole of calcium hydroxide is used per mole of silica. However, 0.9 to 1.1 moles of CaO per mole of $SiO_2$ may be used although the product may, in such a case, contain other crystalline materials. Furthermore, other forms of silica may be used in lieu of sand. Typical such silicas include diatomaceous earth, kaolin or synthetically precipitated silica. If desired, magnesium oxide may be used in lieu of or in conjunction with calcium oxide. For example, dolomitic lime which contains approximately equal moles of CaO to MgO may be used. Other components may also be present.

As pointed out above, the corn starch was used in order to inhibit settling of the product before reaction can occur. It will be understood that other dispersing agents such as carboxymethyl cellulose, polyvinyl alcohol or the like may be used in lieu of starch. The amounts of such agents which are used depend to a large degree upon the dispersibility of the product. Usually, such agents will range from 0.5 to 20 percent by weight based upon the weight of the solids. The amount of water which is used in such a mixture should be sufficient to make the product quite fluid. Normally, it should be sufficient to provide a slurry containing 5 to 10 percent by weight of solids.

According to the present invention, the herein contemplated calcium silicate may be used as an effective opacifier, reinforcing pigment, and/or loading agent for paper. The use of calcium silicate in paper has heretofore been suggested. However, the calcium silicate that has been contemplated prior to the present invention has been in the form of a finely divided amorphous powder. When such calcium silicate is mixed with paper pulp and the resulting product is sheeted out into paper on a Fourdrinier machine, an appreciable amount of the pigment passes through the Fourdrinier screen and is dispersed in the waste water. While some recovery of this calcium silicate is possible, this involves substantial expense. According to the present invention, acicular calcium silicate of the type contemplated here is retained in such a process to an appreciably greater degree than is amorphous calcium silicate.

In the practice of this embodiment of the invention, the calcium silicate may be slurried with the paper pulp prior to flowing on to the Fourdrinier machine, and the resulting mixture may be sheeted out into paper according to conventional methods. The acidity or alkalinity of the paper pulp suspension has a material influence upon the type of product which is obtained. That is, if the paper pulp suspension is acidic, the acid in the pulp suspension reacts with the calcium silicate introduced. This inevitably causes decomposition of the calcium silicate with consequent production of silica. Furthermore, the crystal structure is destroyed or at least changed. Consequently, where it is desired to maintain an acicular crystal structure in the paper, the use of acids should be avoided.

Of course, it will be understood that the paper pulp suspensions used may be either acidic or basic, depending upon the results desired. It will also be understood that where the slurry is acidic, the type of product produced depends upon the nature of the acidity. That is, where the acid component of the pulp slurry forms a water soluble calcium salt, the primary loading component due to the calcium silicate is finely divided silica. Typical acids which will effect this result are hydrochloric acid, nitric acid, acetic acid, hypochlorous acid, hydrobromic acid, and the like. Where the acid component forms a water insoluble salt of calcium, the resulting paper will contain silica and a salt of calcium as well. Typical acids of this type include carbon dioxide, sulphur dioxide, sulphur trioxide, sulphuric acid, sulphurous acid, hydrogen sulfide, etc.

In addition, the various acid salts which have acid reaction in aqueous medium may be used in lieu of or in conjunction with any of the above acids. Thus, aluminum sulfate, aluminum sulfite, ammonium sulfate, and the like may be used in lieu of sulphuric acid. In like manner, ammonium chloride may be used in lieu of hydrochloric acid. Numerous other typical salts which form acidic solutions likewise may be used, such as monosodium acid phosphate, disodium acid phosphate, sodium disulfite, and the like.

In general, the pH of the paper slurry should be in the range of 4 to about 9.2. For most purposes, it is found desirable to avoid the decomposition of calcium silicate since this disrupts the crystalline structure of the product, thus reducing the advantages which accrue. Hence, the pH of the medium in such a case should be neutral or on the alkaline side, that is, 7 or above.

The following examples are illustrative of the present invention:

EXAMPLE II

A pulp beater is charged with a pulp slurry of the following proportionate compositions:

| | Grams |
|---|---|
| Unbleached sulfite pulp | 90 |
| Bleached kraft pulp | 180 |
| Hard white envelope cuttings | 90 |

This charge is dispersed in 23 liters of water and the resulting slurry is beaten in a beater for 80 minutes to approximately 400 milliliters of freeness, Canadian standard (Tappi standard, T–227–M–50). One hundred milliliters of prepared rosin size of about 5 percent by weight size is then added. Thereafter, 9 grams of pregelatinized starch is added and the pulp is circulated in the beater long enough to ensure complete mixing. Aluminum sulfate in the amount of 3 percent by weight, based on the dry weight of pulp, is added as a solution containing 12.92 grams of aluminum sulfate octadecahydrate per liter. Stirring is continued for 2 minutes. Immediately thereafter, one percent by weight of calcium silicate prepared as in Example I is added. Stirring of the mixture is continued for 10 minutes and the resulting stock is diluted to 8000 milliliters, divided into 8 milliliter portions, and sheeted into paper.

EXAMPLE III

Three hundred eighty-five grams of kraft pulp is slurried in 23 liters of water, soaked 2 hours, and beaten for 3 hours in a Niagara beater at 6500 gram bar load. Fourteen hundred grams of the resulting pulp slurry is diluted to 5900 grams. A slurry containing approximately 1 gram of calcium silicate prepared as in Example I in 400 milliliters of water is prepared and is added to the resulting pulp slurry and the mixture is stirred for 5 minutes. Thereafter, the mixture is sheeted out into paper according to conventional methods.

According to a further embodiment of the invention, the calcium silicate prepared as in Example I or as in equivalent methods disclosed above may be used as a reinforcing pigment or filler in rubber. The following is a typical example:

EXAMPLE IV

Finely divided calcium silicate prepared as in Example I was dispersed in the following rubber composition:

|  | Parts by weight |
|---|---|
| Natural rubber | 100.0 |
| ZnO | 5.0 |
| Sulphur | 3.0 |
| Phenyl beta naphthylamine | 1.0 |
| Stearic acid | 3.0 |
| Diorthotolyl guanidine | 1.25 |
| Calcium silicate of Example I | 42.0 |

The resulting composition was mixed in a roll mill, was sheeted out, and was cured according to conventional procedures at 285° F. The resulting product was tested for tensile and other properties, the results of such tests being indicated below:

Table I

| Minutes of Cure at 280° F. | Modulus at 300% Elongation, pounds per square inch | Tensile, pounds per square inch | Elongation, per cent | Hardness | | Tear, pounds per one-tenth inch thickness |
|---|---|---|---|---|---|---|
| | | | | 0" | 30" | |
| 3 | 300 | 510 | 420 | 44 | 35 | 50 |
| 7.5 | 500 | 1,460 | 520 | 45 | 38 | 60 |
| 10 | 540 | 1,500 | 500 | 45 | 39 | 70 |
| 15 | 510 | 1,930 | 580 | 46 | 42 | 100 |
| 30 | 750 | 2,670 | 580 | 48 | 45 | 130 |
| 90 | 880 | 3,320 | 560 | 57 | 54 | 150 |

The calcium silicate herein contemplated may be used for numerous other purposes in accordance with the present invention. For example, this calcium silicate may be used effectively for filtration purposes. Thus, a layer of the calcium silicate may be deposited upon a filter wheel or filter candle and the layer may be used as filter paper or filter surface.

This filter cake thus formed may be used as a filter to filter various suspensions such as finely divided aqueous calcium carbonate slurries, silica slurries, and the like. An especially advantageous process involves the filtration of fluid mixtures at elevated temperatures. Thus, it is possible to effect filtration of gases which may be at any convenient temperature, for example, as high as 500° C. or even higher.

If desired, the acicular calcium silicate herein contemplated may be mixed with fibrous materials, such as glass wool, asbestos, or the like in order to impart strength, opacity, bulk, and/or other properties to the product.

Furthermore, porous resinous materials may be prepared by lightly coating the surface of the acicular calcium silicate with a binding agent such as a phenol-formaldehyde resin, silicone resin, or an ester of an alpha-beta unsaturated acid such as maleic anhydride or maleic acid and a polyhydric alcohol such as ethylene glycol, propylene glycol or diethylene glycol, or other thermosetting resin. This lightly coated product may then be felted together and cured to form a porous mat in which the needles of calcium silicate are lightly bonded to each other by the resin. Such a product may be used effectively as a heat insulator or as an air filter. The coating desired may be effected by wetting the calcium silicate with a relatively dilute solution of the polyester of the type described above or of the phenolic resin, preferably containing a curing catalyst, and permitting the solvent to evaporate. Thereafter, the product may be cured by heating the coated material while the needles are in contact with each other to a curing temperature, for example, 70 to 200° C. depending upon the curing temperature of the resin. Usually, relatively dilute solutions of the resin forming materials, for example, solutions containing from 1 to 10 percent by weight of the polymerizable material are used for this purpose. This is in order to ensure production of a highly porous product.

According to a further embodiment of the invention, the calcium silicate herein contemplated may be used as a filler for various synthetic resins. For example, the acicular calcium silicate may be mixed with a polymerizable material such as allyl esters of polybasic acids, including diallyl phthalate, diallyl maleate, dimethylyl phthalate, dimethyl maleate, diallyl fumarate, diallyl succinate or the like, diallyl melamine, triallyl cyanurate or a polyester of an alpha-beta unsaturated dibasic acid, such as maleic or fumaric acid or anhydride, and a polyhydric alcohol such as propylene glycol, ethylene glycol, glycerol, diethylene glycol or the like, and the mixtures thereof may be polymerized. This polymerization normally is effected by incorporating a catalyst, such as a peroxide, in the mixture and heating it to an elevated temperature, for example, 70 to 125° C. The calcium silicate in such a case serves as a filler and serves to opacify the product and also improves the strength characteristics thereof.

An especially advantageous effect is achieved by applying a mixture of calcium silicate and polyester or other polymerizable material to the surface of a resin which is reinforced by a fibrous material such as cellulose, glass fiber, asbestos or the like, in spun, felted or woven form. The calcium silicate serves effectively to mask the fibrous or woven structure of the reinforcement and also to protect the surface and increase its water resistance. Thus, a fiber reinforced resin normally has fibers which extend to the surface of the resin structure. These fibers tend to attract water by capillary action and impair the water resistance of the product. By coating these products with calcium silicate which is bonded by a polymerizable material, preferably the same resin which is used to bond the fiber, the ends of the fibers are coated effectively and water penetration through the fibers is thereby inhibited or prevented. This coating may be effected by applying a mixture of the calcium silicate and polymerizable material to an already polymerized fiber reinforced resin and polymerizing the coated product. Alternatively, it may be effected during the production of the fiber reinforced resin product.

The following examples are illustrative:

EXAMPLE V

Diallyl phthalate containing 5 percent by weight of benzoyl peroxide is heated at 80 to 85° C. in a flask equipped with a stirrer and a one-millimeter glass tube provided with two spaced marks. At the beginning of the heating period and periodically thereafter, the diallyl phthalate is drawn up into the tube and allowed to flow back, the time required for the liquid to flow between the two marks being observed with a stop watch. When the time increases to 15 times the initial time, the syrup obtained is cooled to room temperature. A sheet of cellophane is laid out on a rigid base and is coated with a thin layer, for example, about 1/32" of the acicular calcium silicate produced according to Example I. The layer is centrally distributed on the cellophane so that the marginal edges are uncoated. Three parts by weight of the thickened diallyl phthalate per part of calcium silicate is poured on the calcium silicate layer. A stack of ten layers of muslin cloth is laid upon the calcium silicate layer and thickened diallyl phthalate is poured on the layers and distributed between the layers in the proportion of 3 parts by weight of the diallyl phthalate per weight of cloth, the distribution of the syrup being such that impregnation is substantially uniform. A cellophane cover sheet is then laid upon the impregnated laminate so that the cellophane sheet covers the laminate and the edges of the cellophane overlap the laminate. A roller is placed in the middle of the assemblage and excess polymerizable syrup forced out to the edges of the assemblage, and the resulting laminate is compacted and rolled until the resin content of the fabric is about 60 percent by weight, based upon the total weight of the material. Entrapped air is thus forced out of the laminate along with the excess polymerizable syrup between the overlapped edges of the cellophane, and the assemblage is sealed by the excess syrup against reentry of air. Metal strips are placed on the overlapping edges of the cellophane and the strips are clamped to the rigid base so as to maintain the seal and to hold the cellophane tightly in place during cure. The resulting product is then placed in an oven and cured according to the following cycle: ½ hour at 174° F., ½ hour at 180° F., ½ hour at 185° F., ½ hour at 190° F., ½ hour at 200° F., 15 minutes at 207° F., 15 minutes at 215° F.

EXAMPLE VI

A polymerizable resin is prepared by reacting 22 moles of propylene glycol, 88 moles of ethylene glycol, 12.5 moles of phthalic anhydride, and 87.5 moles of maleic anhydride, according to conventional procedures, to an acid number of about 35. This product is mixed in the proportion of 21.3 parts by weight of the resulting polyester with 11.5 parts by weight of diallyl phthalate, 1.3 parts by weight of catalyst consisting of 50 percent benzoyl peroxide and 50 percent tricresyl phosphate, 2 parts of zinc stearate, and 60 parts of calcium silicate prepared according to Example I. The mixing may be effected in a Banbury mill and is continued until a soft homogeneous product is obtained. This mixture is placed in a mold and the mold is closed and a pressure of about 2000 pounds per square inch is applied. During application of the pressure, the mixture is heated at 125° C. for about 5 minutes. A hard, well-bonded molding is obtained.

EXAMPLE VII

The process of Example V is performed except that the polymerizable material used is a propylene maleate phthalate polyester stabilized with trimethyl benzyl ammonium chloride as described in Example I of U.S. Patent No. 2,593,787. This polymerizable material contained 2 percent by weight of benzoyl peroxide. The curing of the assemblage is effected by heating for 30 minutes at 100° C.

EXAMPLE VIII

Propylene glycol-maleate-phthalate ester prepared by reacting together 2.2 moles of propylene glycol, 1 mole of maleic anhydride, and 1 mole of phthalic anhydride, to an acid number of 50, is dissolved in acetone in the proportion of approximately 1 part of polyester per 10 parts of acetone. One percent benzoyl peroxide (based on the weight of the polyester) is dissolved in the solution. Acicular calcium silicate prepared as in Example I is coated with this solution, well centrifuged, and lightly pressed into the form of a batt approximately 2 inches thick. This mixture is then heated until the solvent has completely evaporated and then the temperature is raised to 100° C. for approximately 5 minutes. There is thus obtained a porous panel which may be used as a heat insulation or sound insulation.

As mentioned in Example VIII, the calcium silicate herein contemplated may be used as a heat or sound insulation. For such use, it may be bonded as described in Example VIII or it may be used in loose form. When used in loose form, it is simply distributed loosely in a preformed receptacle. For example, in building construction, the usual walls comprise an inner and outer wall which are spaced a substantial distance apart. The calcium silicate may be sprayed or otherwise distributed in this space. For pipe insulation, a suitable container of cylindrical or semi-cylindrical segments may be prepared and the container may be filled with the calcium silicate. If desired, the acicular calcium silicate contemplated here may be mixed with other heat insulation materials, for example, magnesium oxide, asbestos, glass fiber or the like.

The herein contemplated calcium silicate is of value for the provision of suspensions which either do not settle at all or settle out but slowly. Thus, a dispersion of the calcium silicate produced according to Example I in toluene remains essentially in stable form over a period of many days.

According to a further embodiment of the invention, the calcium silicate herein contemplated may be dispersed in paint vehicles in paint and coating compositions containing the usual film forming materials, notably alkyd resins, cellulose plastics, and the like. This is especially true in coating compositions where an organic solvent, such as toluene, is the primary vehicle. The calcium silicate may be used in conjunction with other pigments, including titanium dioxide, chromic oxide, zinc oxide, and the like. The amount of calcium silicate which may be used in such a product varies considerably in accordance with the results desired. Usually, other pigments are used in conjunction with the calcium silicate, and the amount of calcium silicate used will normally range from 1 to 10 percent by weight, based upon the weight of the composition minus the water.

According to a further embodiment, the herein contemplated calcium silicate may be used as a decolorizing agent or as an adsorbent for the clarification and decolorization of vegetable oils.

The following is a typical example of this embodiment of the invention:

EXAMPLE IX

One thousand parts by weight of a degummed soya oil which has been treated with water in order to remove some of the break constituents is introduced into a container and heated to a temperature of 105 to 110° C. To this oil is added 12.5 parts by weight of acicular calcium silicate prepared as in Example I. Enough inert gas is introduced to maintain a blanket above the oil, and steam is introduced into the mixture at a rate of 0.1333 pound per 100 pounds of oil. This steam is continued for a period of 30 minutes. Thereafter, the oil is dried by bubbling inert gas through the mixture for 30 minutes or until the oil tests free of moisture. The resulting oil is then drawn off and filtered. The above process not only serves to decolorize the product but also removes fatty acid components, chlorophyll, and the like.

According to a further embodiment of the invention, the acicular calcium silicate herein contemplated may be used as the filter element in a cigarette. Thus, cigarettes having filter tips are well known. These filters are normally incorporated at one end of the cigarette and the calcium silicate herein contemplated may be disposed in the conventional location. An especially valuable characteristic of calcium silicate filter tips in cigarettes lies in the high temperature stability of the calcium silicate and its power to hold tarry residues.

Acccording to a further embodiment, the acicular calcium silicate may be incorporated as a loading and reinforcing or stiffening material in various fabrics such as cotton, linen, nylon, silk, wool, and like woven fabrics. The calcium silicate may be incorporated in these materials by forming an aqueous suspension thereof, with or without a sizing agent such as starch, and impregnating the woven fabric with the calcium silicate slurry.

Cement may be prepared from the calcium silicate herein contemplated by mixing with aluminum oxide containing clay, and lime. Sufficient line and clay should be added to adjust the composition of the mixture to the following proportions:

| | Percent by weight |
|---|---|
| CaO | 55 to 65 |
| $SiO_2$ (including the $SiO_2$ in the calcium silicate) | 20 to 25 |
| $Al_2O_3$ | 4 to 11 |

The resulting mixture may be slurried in aqueous medium and the slurry heated in order to cause it to set.

The various embodiments of the invention discussed above have been described with reference to acicular calcium silicate. It will be understood that other acicular alkaline earth metal silicates may be used in lieu of acicular calcium silicate. For example, products prepared using magnesium oxide, barium oxide, strontium oxide or the corresponding hydroxides of these metals or mixtures of these materials, such as dolomitic lime, may be used in lieu of calcium oxide or hydroxide in the practice of the process disclosed in Example I. The resulting products may be used in lieu of acicular calcium silicate in the various other embodiments described above.

Although the present invention has been described with reference to the specific details of certain embodiments, it is not intended that such details shall be regarded as limitations upon the scope of the invention except insofar as included in the accompanying claims.

What is claimed:

1. A method which comprises reacting a mixture of calcium hydroxide and silica in substantially equimolecular proportions and enough water to prevent the mixture from setting up, at a superatmospheric pressure and a temperature substantially in the range of 450° F. to 650° F. while agitating the mixture to prevent the mass from setting up and thereby producing acicular calcium silicate, and recovering and drying the calcium silicate at a temperature sufficiently low to prevent disruption of the acicular structure thereof, said calcium silicate being in the form of particles constituting a relatively fine powder, grinding said powder until the needles constituting said particles are liberated and interrupting said grinding before the needles are broken up, said grinding providing a fluffy, readily-dispersible calcium silicate product resembling cellulose floc.

2. A method which comprises reacting a mixture of calcium hydroxide and silica in substantially equimolecular proportions and at least 8 parts by weight of water per part of solids, at a superatmospheric pressure and a temperature substantially in the range of 450° F. to 650° F. while agitating the mixture to prevent the mass from setting up and thereby producing acicular calcium silicate, recovering and drying the calcium silicate at a temperature sufficiently low to prevent disruption of the acicular structure thereof said calcium silicate being in the form of particles constituting a relatively fine powder, grinding said powder until the needles constituting said particles are liberated and interrupting said grinding before the needles are broken up, said grinding providing a fluffy, readily-dispersible calcium silicate product resembling cellulose floc.

3. A method of preparing paper which comprises reacting a mixture of calcium hydroxide and silica in substantially equimolecular proportions and enough water to prevent the mixture from setting up, at a superatmospheric pressure and a temperature substantially in the range of 450° F. to 650° F. while agitating the mixture to prevent the mass from setting up, and thereby producing acicular calcium silicate, recovering and drying the calcium silicate at a temperature sufficiently low to prevent disruption of the acicular structure thereof, said calcium silicate being in the form of particles constituting a relatively fine powder, grinding said powder until the needles constituting said particles are liberated and interrupting said grinding before the needles are broken up, said grinding providing a fluffy, readily-dispersible calcium silicate product resembling cellulose floc mixing the resulting fluffy, needle-like, acicular calcium silicate with cellulose fibers, and forming paper sheets from the resulting mixture.

4. A method which comprises reacting a mixture of calcium hydroxide and silica in substantially equimolecular proportions and at least 8 parts by weight of water per part of solids, at a superatmospheric pressure and a temperature substantially in the range of 450° F. to 650° F. while agitating the mixture to prevent the mass from setting up, and thereby producing acicular calcium silicate, recovering and drying the calcium silicate at a temperature sufficiently low to prevent disruption of the acicular structure thereof, said calcium silicate being in the form of particles constituting a relatively fine powder, grinding said powder until the needles constituting said particles are liberated and interrupting said grinding before the needles are broken up, grinding providing a fluffy, readily-dispersible product resembling cellulose floc, mixing the resulting fluffy, needle-like, acicular calcium silicate with cellulose fibers, and forming paper sheets from the resulting mixture.

References Cited in the file of this patent

UNITED STATES PATENTS

| Number | Name | Date |
|---|---|---|
| Re. 8,803 | Tomkins | July 15, 1879 |
| 296,463 | Rupp | Apr. 8, 1884 |
| 1,345,317 | Clapp | June 29, 1920 |
| 1,948,609 | Andrews et al. | Feb. 27, 1934 |
| 2,032,827 | Andrews | Mar. 3, 1936 |
| 2,237,374 | Smith | Apr. 8, 1941 |
| 2,247,355 | Brown | July 1, 1941 |
| 2,304,361 | Hoskins | Dec. 8, 1942 |
| 2,498,353 | Bierce | Feb. 21, 1950 |
| 2,547,127 | Kalousek | Apr. 3, 1951 |
| 2,554,934 | Ayers | May 29, 1951 |
| 2,599,094 | Craig | June 3, 1952 |
| 2,600,321 | Pyle | June 10, 1952 |
| 2,657,974 | Cook et al. | Nov. 3, 1953 |
| 2,665,996 | Kalousek | Jan. 12, 1954 |